(12) United States Patent
Menin (10) Patent No.: US 6,693,254 B2
(45) Date of Patent: Feb. 17, 2004

(54) METHOD AND SYSTEM FOR LASER WELDING OF TWO OR MORE OVERLAPPED METAL SHEETS, AND SHEET CLAMPING DEVICE USED IN THIS METHOD

(75) Inventor: Roberto Menin, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 18 days.

(21) Appl. No.: 10/084,992

(22) Filed: Mar. 1, 2002

(65) Prior Publication Data

US 2002/0130111 A1 Sep. 19, 2002

(30) Foreign Application Priority Data

Mar. 2, 2001 (IT) ...................................... TO2001A0186

(51) Int. Cl.[7] .............................................. B23K 26/00
(52) U.S. Cl. ............................ 219/121.63; 219/121.64; 219/121.85
(58) Field of Search ....................... 219/121.63, 121.64, 219/121.85, 78.15, 121.14

(56) References Cited

U.S. PATENT DOCUMENTS

| 4,030,525 A | * | 6/1977 | Bassler et al. ............... 428/586 |
| 4,745,257 A | | 5/1988 | Rito et al. |
| 5,383,592 A | * | 1/1995 | Fussnegger et al. ......... 228/135 |
| 5,573,222 A | * | 11/1996 | Ruehl et al. ................. 248/647 |
| 5,603,853 A | * | 2/1997 | Mombo-Caristan .... 219/121.64 |
| 6,060,681 A | * | 5/2000 | Bachhofer et al. ..... 219/121.63 |

FOREIGN PATENT DOCUMENTS

| JP | 10 156 566 A | 6/1998 |
| WO | WO 01 12378 A | 2/2001 |

* cited by examiner

*Primary Examiner*—M. Alexandra Elve

(57) ABSTRACT

Two or more metal sheets, at least one of which has a protective layer made of material having a low vaporization temperature, are welded to each other by means of a laser beam after that a gap has been provided between the sheets to enable the vapors of the protective material which are created during welding to escape. The gap is obtained by exploiting the elastic return of one of the sheets starting from an elastically deformed condition in which this sheet is brought following the engagements of the device hich is used to clamp the sheets with each other during welding. In a first stage, the clamping device is closed to bring the sheets in complete contact with each other, by causing the above-mentioned elastic deformation of one of the sheets, in a second stage, the clamping device is opened again by a limited extent, until a predetermined position is reached, so as to define a gap between the sheets having substantially predetermined dimensions.

14 Claims, 5 Drawing Sheets

METHOD AND SYSTEM FOR LASER WELDING OF TWO OR MORE OVERLAPPED METAL SHEETS, AND SHEET CLAMPING DEVICE USED IN THIS METHOD

BACKGROUND OF THE INVENTION

The present invention relates to a method and a system for laser welding of overlapped metal sheets.

The welding of overlapped metal sheets by means of a laser beam has been already proposed since a long time, particularly in the automotive industry, for the production of motor-vehicle bodies or parts thereof, in lieu of the more conventional electric spot welding. After an initial increasing spread of the laser welding technique approximately starting from 1990 (see for example European patent EP-B-0 440 001 in the name of Comau), the application of this technology in the automotive industry has seen a stop due to the increasing use in a motor-vehicle bodies of zinc plated sheets, i.e. sheets coated with a protective zinc layer for example deposited by galvanization in motor-vehicle bodies. Zinc has a melting temperature of 419° C., and a vaporization temperature of 906° C., whereas the steel forming the sheet typical as a melting temperature around 1530° C. In order to weld the sheets, it is necessary to bring the steel of which they are constituted to melting, which means that the welding is carried out in the presence of zinc vapours. In the case of electric spot welding, the vapours do not give rise to any substantial drawbacks, since the steel of the sheets begins to melt at the contact area between the sheets (because this area is that having the highest electric resistivity) and due to that the welding electrodes apply also a pressure on the sheets which causes the expulsion from the contact area of the sheets of any quantities in excess of the melting bath and the zinc vapours. In the case of laser welding, instead, the melting bath starts to be created at the outer surface of the sheet where the laser beam is directed. As soon as the area of the melting bath, which typical assumes a keyhole-shaped form, extends down to the contact area between the sheets, the zinc vapours meanwhile created at this area escaped outwardly through the route of least resistance, constituted by the melting bath. Therefore, spray of melted metal occur which jeopardize the quality and strength of the welded joint, as well as the aesthetical appearance of the product thus obtained.

Various solutions have been proposed in the past in the endeavour to overcome the above-mentioned drawback. A first solution is to modify the shape of at least one of the sheets at the welding area so as to define a gap between the overlapped sheets which can be exploited by the zinc vapours to escape upwardly (see for example U.S. Pat. Nos. 4,682,002 and 4,916,284). A similar solution lies in providing spacing elements between the sheets, again in order to define a gap for evacuation of the zinc vapours (WO-A-99/08829, JP-A-5318155). All the above-indicated known solutions have the drawback however to require that an additional operation is carried out with respect to the conventional work cycle, since it is necessary to form the above-mentioned spacing deformed portions in the sheets or anyhow to apply additional elements thereto, which increases time and costs of production.

SUMMARY OF THE INVENTION

The object of the present invention is that of overcoming the above-described technical problem in a simple and efficient way.

In order to achieve this object, the invention provides a method for laser welding of two or more metal sheets which are overlapped to each other, wherein at least one of the sheets has a protective layer on its surface in contact with the other sheet, said protective layer being of a material having a temperature of vaporization lower than the melting temperature of the material forming the sheet, wherein the sheets to be welded are clamped to each other during the welding operation with the aid of clamping means which are movable between an inoperative condition and an operative condition in order to press the overlapped sheets against each other, and wherein welding is carried out by directing a laser beam at the welding area of the clamped overlapped sheets, said method being characterized in that:

at least one of the sheets is shaped or arranged so that when the clamping means are brought from their inoperative condition to their operative condition, in which they press the sheets against to each other, this sheet undergoes an elastic deformation from a rest condition in which a gap is defined between this sheet and the adjacent sheet, to a deformed condition in which this gap is nullified and the sheets are completely in contact with the each other at the welding area, and in that before carrying out the welding operation, the clamping means are controlled according to the following sequence of stages:

in a first stage, the clamping means are brought from their inoperative condition to their operative condition, so as to insure the complete contact between the welding sheets through said elastic deformation, in a second stage, the clamping means are moved back towards their inoperative condition, by a predetermined limited length, so as to create again a gap of substantially predetermined dimensions between the sheets to be welded, by exploiting the elastic return of said sheet which has been elastically deformed in the fist stage, the clamping means are kept in the condition reached there by while welding is carried out, so that the vapours of protective material which are created during welding can escape through said gap.

Due to the above-mentioned features, the method according to the invention is able to successfully overcome the problem of the evacuation of zinc vapours which are created during laser welding of overlapped zinc-plated sheets. As in the case of the above-mentioned prior art, the vapours are let to escape through a gap defined between the sheets, so that the vapours are not encouraged to pass through the melting bath, which would give origin to the above-mentioned drawbacks. However, while in the case of the prior art the gap for evacuation of the vapours is obtained by a permanent deformation of at least one of the sheets before welding is carried out, or by the introduction of spacing elements between the sheets, in the case of the present invention the sheets are not subjected to any permanent deformation, nor spacing means are provided there between. As a matter of fact, in the case of the invention, the elastic return is simply exploited of at least one of the sheets from the condition of complete contact, in which this sheet is temporarily brought by the clamping means by exploiting the elastic deformability of the sheet, to a less deformed condition which is reached by partially opening again the clamping means until a predetermined position is obtained. In this manner, it is possible to ensure that a gap between the sheets of substantially predetermined dimensions is obtained, which is exploited by the zinc vapours to escape outwardly, without passing through the welding melting bath.

In the preferred embodiment of the invention, the above-mentioned clamping means are provided with sensor means adapted to detect when the condition of complete contact of the sheets is reached at the end of the above-mentioned first stage. These sensor means can be constituted by any type of direct or indirect sensor adapted to detect when this condition is reached, such as force or pressure sensor (which detects when a threshold value is passed) or a sensor of the speed of the movable part of the clamping means (which detects when this part is stopped) or a sensor of movement or a sensor of the electric current absorbed by the electric motor which controls the clamping device (in case this device is electrically actuated) or any other known type of sensor.

Also in the case of the above-mentioned preferred embodiment, the clamping means comprise at least a movable member which is movable between an inoperative position and an operative position by actuating means which are controlled in position.

Naturally, the invention is also directed to the welding system used in the method according to the invention, said system comprising:

said system comprising:
clamping means for clamping the sheets to be welded with each other while welding is carried out, said welding means being movable between an inoperative condition and an operative condition to press the overlapped sheets against each other, and
laser welding means adapted to direct a laser beam at the welding area of the clamped overlapped sheets, said system being characterised in that:
at least one of the sheets is shaped or arranged so that when the clamping means are brought from their inoperative condition to their operative condition, in which said clamping means press the sheets against each other, this sheet undergoes an elastic deformation from a condition in which between this sheet and the adjacent sheet there is defined a gap, to a deformed condition, in which this gap is nullified and the sheets are completely in contact with each other at the welding area, and
in that said device further comprises actuated means for actuating said clamping means, which are controlled according to the sequence of stage which has been described above.

In the preferred embodiment of the system according to the invention, the clamping means are provided, as already indicated, with sensor means adapted to detect when the condition of complete contact of the sheets is reached, and said actuating means are controlled by control means which causes the clamping means to be stopped at the condition of complete contact of the sheet at the end of said first stage.

According to a further feature, the clamping means comprise at least a movable member which is movable between an inoperative position and an operative position, and said control means cause the movable member to be stopped at the end of said second step when they detect that a predetermined position is reached.

The actuating means may comprise an electric motor or a fluid actuator or a piezoelectric actuator or a shape memory alloy actuator or any other means.

According to a further aspect, the invention is also directed to the clamping device per se which is used in the method according to the invention. The clamping device according to the invention is characterised in that it comprises:

at least one clamping movable member movable between an inoperative condition and an operative condition to press the overlapped sheets against each other, actuating means for actuating the clamping movable member, sensor means adapted to detect a condition in which the clamping device holds the sheets in complete contact which each other, control means which receive signals from said sensor means and controls actuating means so that:
in a first stage, the clamping member is brought from its inoperative condition to its operative condition and stopped when reaching is detected of the condition in which the clamping device keeps the sheets in complete contact which other,
in a second stage, the clamping member is moved back towards its inoperative condition, through a limited length, until reaching a predetermined position signalled by said sensor means.

BRIEF DESCRIPTION OF THE DRAWINGS

Further features and advantages of the invention will become readily apparent from the following description with reference to the annexed drawings, given purely by way of non limiting example, in which.

DETAILED DESCRIPTION OF THE INVENTION

FIGS. 1–5 provide a first diagrammatic representation of the method according to the invention. In these figures there are shown two steel sheets 1, 2 each provided with a zinc protective layer, respectively designated by 1a and 2a. The drawings only show the portion of the sheets adjacent to the area where these sheets must be welded to each other. To this end, the sheets 1, 2 have two flanges 3, 4 which are to be welded to each other in an overlapped position by means of a laser beam. FIGS. 1–4 only show, beside the sheets to be welded 1, 2, a clamping device 5, which is for clamping the flanges 3, 4 of sheets 1, 2 to each other for carrying out welding. These figures do not show instead the means for welding typically consisting of a device for focusing a laser beam which is directed on the two flanges 3,4 at the welding area.

Figure 1:
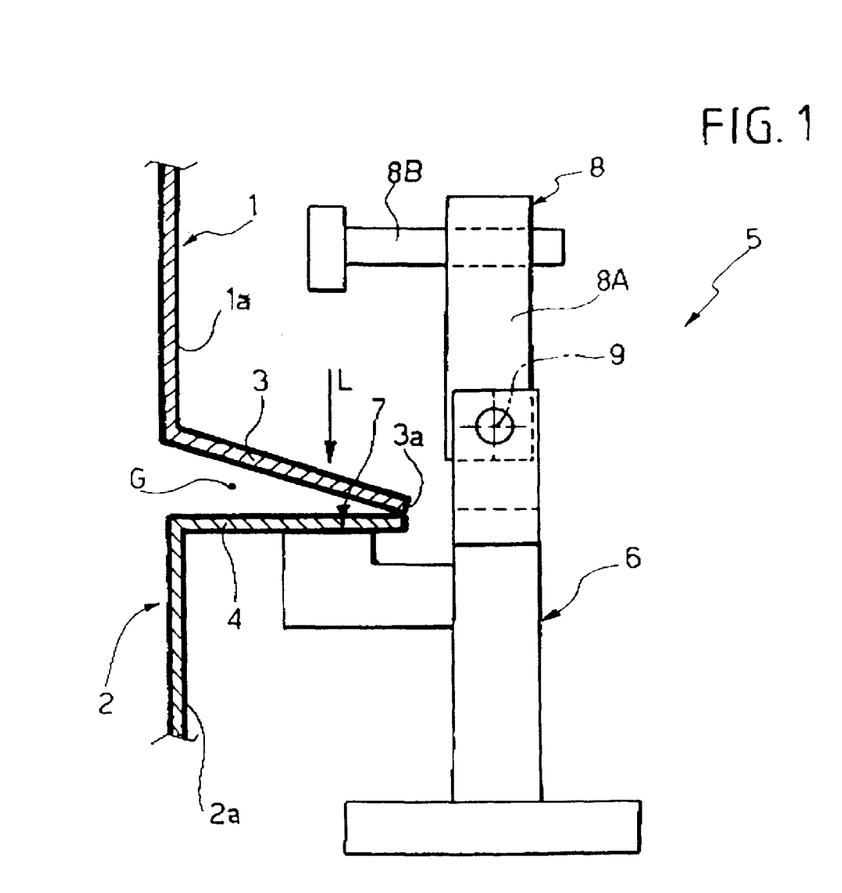
FIG. 1 is a diagrammatic side view of two zinc-plated steel sheets which are to be welded by the method according to the invention and a clamping device used in the method, shown in its inoperative condition.
Figure 2:
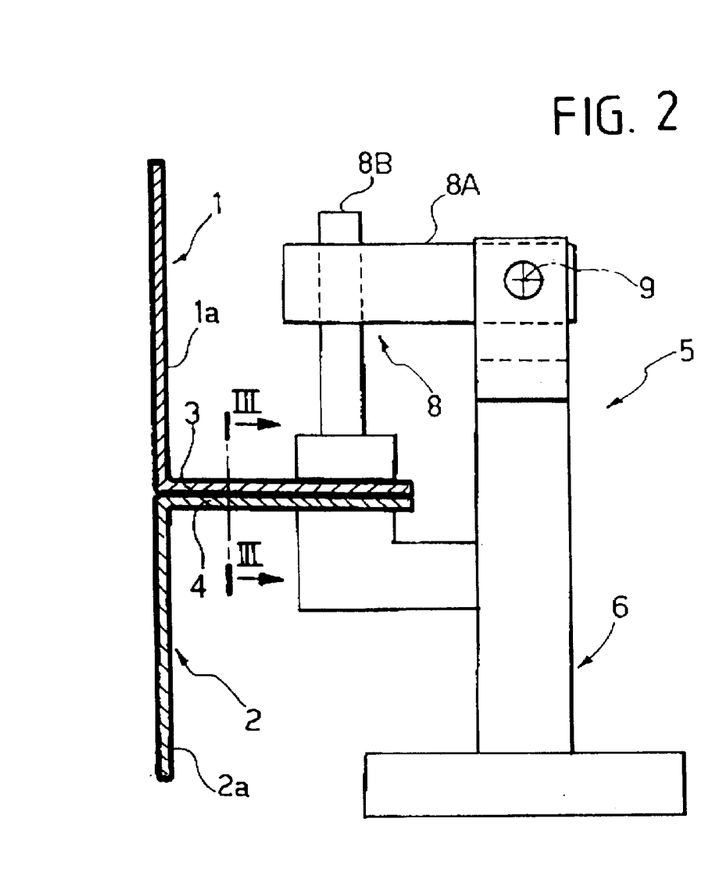
FIG. 2 shows the same parts of FIG. 1, but with the clamping device in its operative condition.

As it will be illustrated with reference to FIG. 6, flanges 3,4 are typically clamped by means of a plurality of clamping devices 5, while the laser bean is displaced relative to the sheets at the area between the clamping devices 5, so as to provide laser welded sections W. In FIG. 1 there is only diagrammatically show an arrow L which indicates the direction of the welding laser beam on the sheets. The details of construction of the laser welding device and of the means for moving the laser beam with respect to the structure to be welded are not illustrated here, since they can be made in any known way and since these details, taken alone, do not fale within the scope of the invention. The deletion of these details from the drawings further renders the latter simpler and easier to understand. The same applies to the construction of the clamping device 5. Clamping devices of this type are normally used in the automotive industry for clamping the metal sheets constituting a car body while a conventional electric spot welding is carried out. The specific arrangement of the clamping device may widely vary, depending upon the shape of the sheets to be clamped and the application means, the clamping device 5 usually has a structure 6 defining a reference and supporting plane 7 of one of the sheets (in the illustrated case for supporting flange 4 of sheet 2) and a clamping moveable member 8 which is pivotally mounted around an axis 9 on the structure 6 between an opened inoperative position (FIG. 1) and a closed operative position (FIG. 2). An example of clamping device may be found in the European Patent EP-B-0 909 607 in the name of Comau spa. This structure 6 can be fixed, or also provided with the possibility of a limited movement for self-centering of the clamping device on the area of the structure to be welded. Further more, obviously, it is possible that the clamping device comprises a second moveable member which is moveable between an inoperative position and an operative position for defining the support 7.

FIGS. 1–4 do not show the actuating means which drive the movement of the movable member 8 of the clamping device 5. These actuating means are designated by 10 in the block diagram of FIG. 5. The most usual technique used for actuating the clamping devices is the use of fluid cylinders. However, also clamping devices have been developed having an electric actuation. These devices typically comprise an electric motor whose output shaft is connected by means of a reducing gear unit to the movable member of the clamping device. This solution may be particularly advantageous in the case of the embodiment of the invention which is shown here even, if the possibility is not excluded to use actuating means constituted by fluid cylinders or actuators of any other type, as specified above.

Figure 5:
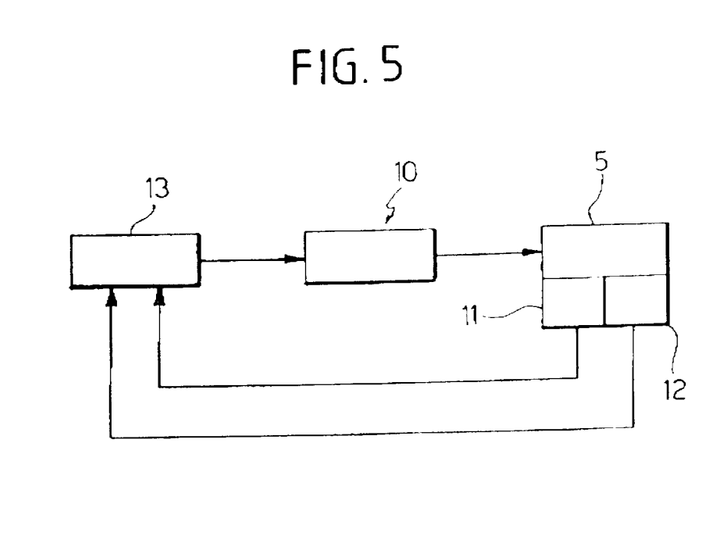
FIG. 5 is a block diagram which shows the welding system according to the invention.

With reference to FIG. 5, with the clamping means 5, and more specifically with the movable member 8 of the clamping device there are associated, in the case of the specific illustrated example, both a force or pressure sensor 11 and a position sensor 12. Also the details of construction and the arrangements of sensors 11, 12 are not shown here, since these sensors may be made in any known way. The position sensor may be associated both directly with the moveable member 8 and with any element of the kinematic chain which connects the actuating means to the movable member. Sensors 11, 12 are able to send output signals to an electric control unit 13 which controls the actuating means 10 according to the signals received from sensors 11, 12 and according to a predetermined logic which will be described in the following.

Figure 3:
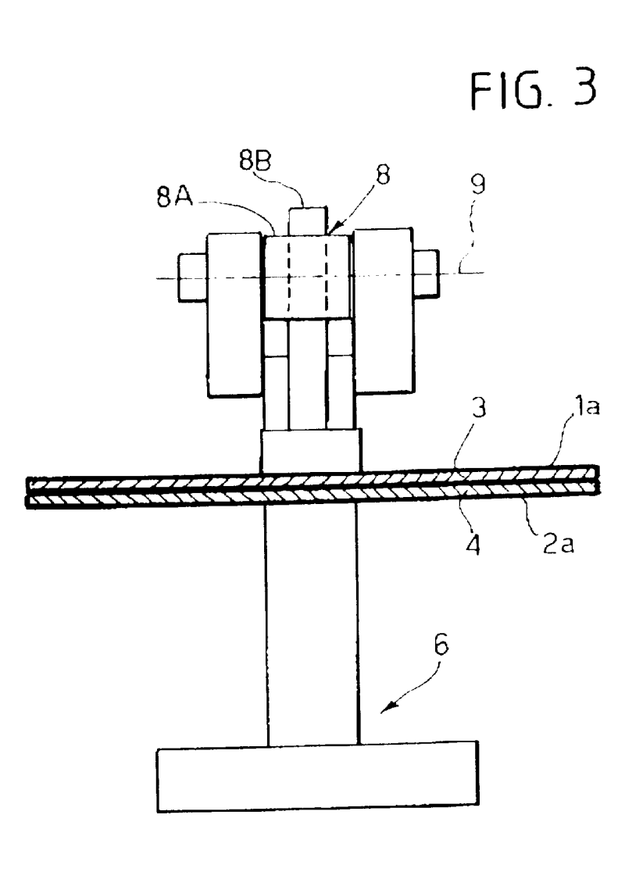
FIG. 3 is a view taken along line III—III of the FIG. 2.

Also with reference to FIG. 1, an essential feature of the invention lies in that at least one of the sheets to be welded (sheet 1 in the case illustrated here) is shaped or arranged such that it is elastically deformed, following the engagement thereon of the clamping member 8, from a rest condition, in which a gap G is defined between the overlapped flanges 3,4 of sheets 1,2, to a condition in which gap G is nullified and flanges 3,4 are completely in contact with each other (FIG. 2, FIG. 3).

Naturally, the shape of the sheets which is shown in the annexed drawings is given purely by way of non limiting example. This shape may be also completely different, while the fact remains that at least one of the sheets must undergo an elastic deformation following closing of the clamping device and that G must be defined between the overlapped sheets when the above mentioned elastic deformation has not yet taken place.

According to the invention, after that the two sheets 1,2 have been arranged in the opened clamping device 5, as shown in FIG. 1, the control means 13 control the actuating means 10 so as to cause closing of the clamping device 5 and up to the condition of complete contact between flanges 3,4 (FIGS. 2,3). This condition is detected when the pressure sensor 11 informs the control means 13 that a predetermined level of pressure has been reached. This condition is achieved, as already indicated, following an elastic deformation of sheet 1. In practice, in the case of the specific illustrated embodiment, flange 3 of sheet 1 has its edge $3a$ in contact with the flange 4 and has a slant upward direction starting from this edge. The pressure applied by the clamping member 8 causes the elastic deformation, since the latter forms part of a more complex structure (see for example FIG. 6) which does not allow sheet 1 to rotate around the contact area on the sheet 4.

Once the condition of the complete contact of flanges 3,4 has been reached (FIG. 2) the control means 13 control the actuating means 10 so has to move the clamping member 8 back towards its inoperative position through a limited length, until reaching a predetermined position (FIG. 4) in which the two flanges define a gap $G_1$ of substantially predetermined dimensions.

This position is identified by control means 13 with the aid of the position sensor 12. In the case of the illustrated example, this result is achieved by providing the member 8 with a main part 8A and an active part 8B slideable with respect to the main part 8A. However, it is conceivable to obtain the required result by rotating the entire member 8 backwardly.

Figure 4:
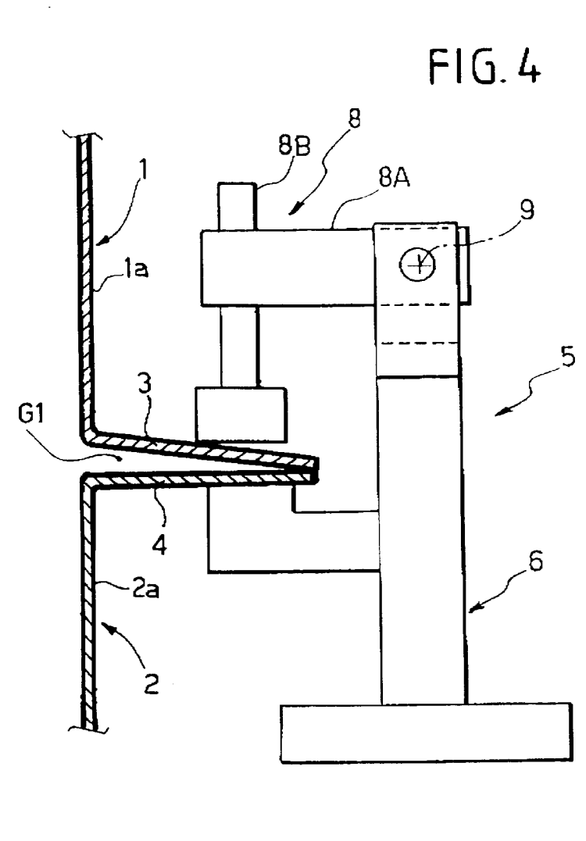
FIG. 4 shows a subsequent stage of the method according to the invention.

Once the condition illustrated in FIG. 4 has been reached, the welding operation is started. Naturally, the presence of $G_1$ does not jeopardize welding, since in the area affected by the laser beam the welding melted bath fills this gap locally.

Figures 6, 7:
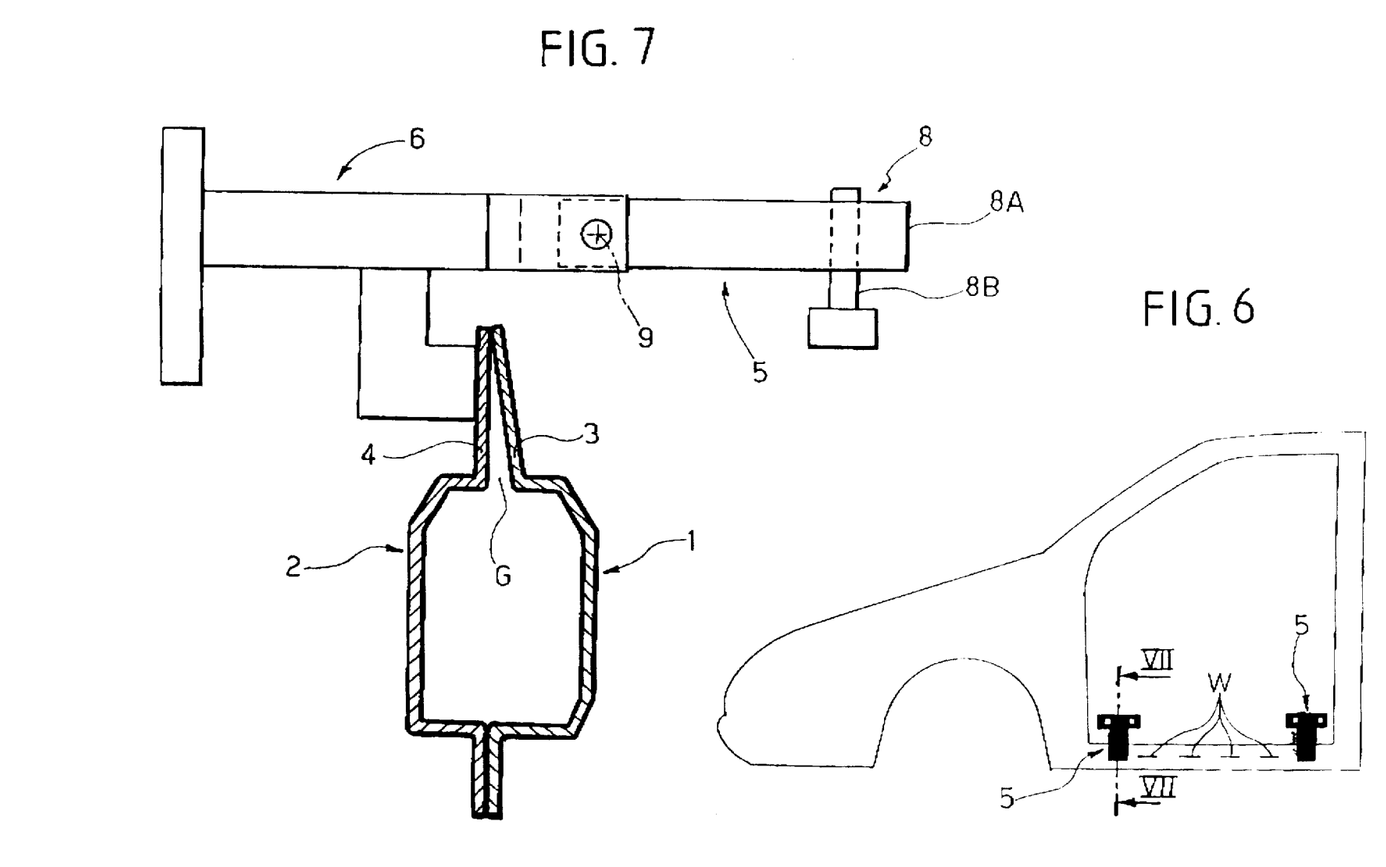
FIG. 6 is a diagrammatic and partial side view of a motor-vehicle body to which the method according to the invention is applied.
FIG. 7 is a diagrammatic cross-sectional view, at an enlarged scale, taken along line VII—VII of FIG. 6, with the clamping device shown in its inoperative condition.
Figure 8:
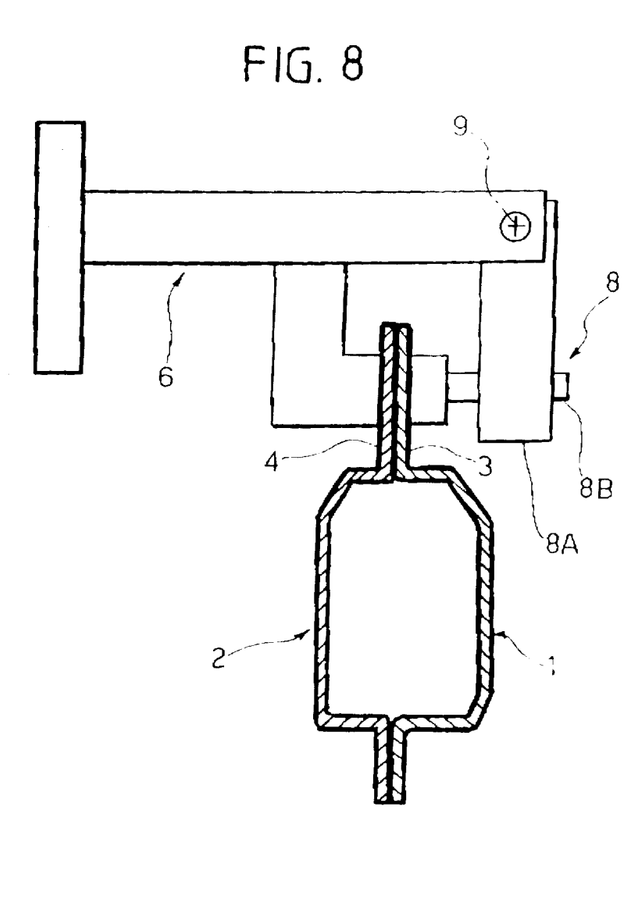
FIGS. 8, 9 show the same structure of FIG. 7 in two subsequent stages of the method according to the invention.
Figure 9:
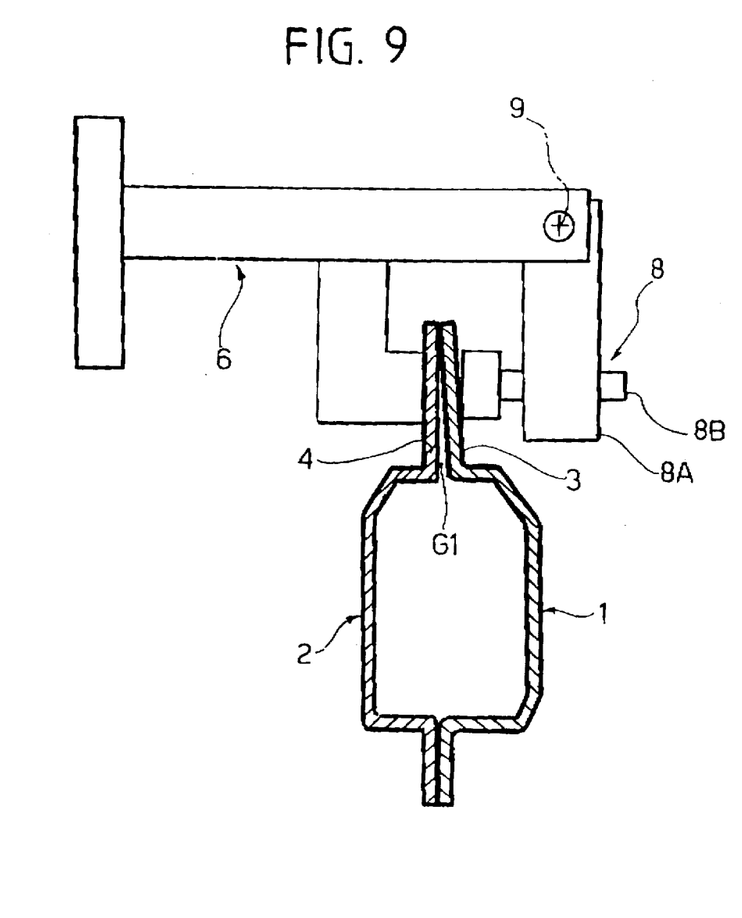

With reference to FIG. 6, which relates to an example of application of the method according to the invention to welding of the outer and inner metal sheets constituting the body of a motor-vehicle along the base portion of a door aperture, the welding device is driven to carry out laser welding along portions W (FIG. 6). FIGS. 7 to 9 specifically show the shape of the sheets to be welded in this starting stage of the method, in the intermediate stage where the flanges to be welded are completely in contact (FIG. 8) and in the stage in which the flanges are partially spaced part, during which welding is carried out (FIG. 9).

As already indicated, the structure of the welding devices and the means for moving the laser beam are not shown, since they can be made in any known way. Naturally, applications of the invention are not excluded in which it is the piece to be welded which moves relative to the laser beam.

As clearly apparent from the foregoing description, the invention lies in providing a gap $G_1$ between two zinc-plated steel sheets which are to be welded by a laser beam, in a simple and efficient manner, without requiring operations for permanently deforming the sheets before welding, or for adding spacing elements there between. While laser welding is carried out, the presence of $G_1$ enables the zink vapours to escape, so that these vapours are not compelled to pass through the welding bath and therefore do not generate any welding defects.

Obviously, the invention is applicable both when all the sheets have a protective layer, and also when only one of them has this layer.

Furthermore, the application of the invention is not excluded also too non-protected sheets.

Naturally, while the principle of the invention remains the same, the details of construction and the embodiments may widely vary with respect to what has been described and illustrated purely by way of example, without departing from the scope of the present invention.

What is claimed is:

1. Method for laser welding of two or more metal sheets which are overlapped with each other, wherein at least one of the sheets has a protective layer on its surface in contact with another sheet, said layer being made of a material having a vaporization temperature lower than the melting temperature of the metal forming the sheet, wherein the sheets to be welded are clamped with each other during the welding operation with the aid of clamping means which are moveable between an inoperative condition and an operative condition to press the overlapped sheets against each other, and wherein welding is carried out by directing a laser beam at the welding area of the clamped overlapped sheets, wherein:

at least one of the sheets is shaped or arranged such that when the clamping means are brought from their inoperative condition to their operative condition, in which the clamping means press the sheets against each other, said at least one of the sheets will undergo an elastic deformation from a rest condition in which a gap is defined between this sheet and the adjacent sheet, to a deformed condition in which this gap is nullified and the sheets are completely in contact with each other at the welding area, and in that before welding is carried out the clamping means are controlled according to the following sequence of stages:

in a first stage the clamping means are brought from their inoperative condition to their operative condition so as to ensure the complete contact of the sheets to be welded due to said elastic deformation, in a second stage the clamping means are moved back towards their inoperative condition, through a predetermined limited length, so as to create again a gap having substantially predetermined dimensions between the sheets to be welded by exploiting the elastic return of the sheet which is elastically deformed during the first stage, the clamping means are kept in the condition reached thereby during welding so that the vapours of protective material which are generating during welding can escape through said gap.

2. Welding method according to claim 1, wherein said clamping means are provided with sensor means able to detect the reaching of the condition of complete contact of the sheets at the end of the first stage.

3. Welding method according to claim 2, wherein the clamping means comprise at least one movable member which is movable between an inoperative position and an operative position by actuating means which are controlled in position.

4. System for laser welding of two or more metal sheets which are overlapped with each other, wherein at least one of the sheets has a protective layer on its surface in contact with another sheet, said layer of protective material having a vaporization temperature lower than the melting temperature of the material forming the sheets, said system comprising:

clamping means for clamping the sheets to be welded to each other during the welding operation, said clamping means being movable between an inoperative condition and an operative condition to press the overlapped sheets against each other, means for laser welding able to direct a laser beam at the welding area of the clamped overlapped sheets, said system being wherein:

at least one of the sheets is shaped or arranged such that when the clamping means are brought from their inoperative condition to their operative condition, in which they press the sheets against each other, said sheet undergoes an elastic deformation from a rest condition in which a gap is defined between this sheet and the adjacent sheet, to be deformed condition in which this gap is nullified and the sheets are completely in contact with each other at the welding area and in that said device further comprises actuating means said clamping means, which are controlled such that:

in a first stage, the clamping means are brought from their inoperative condition to their operative condition so as to ensure the complete contact of the sheets to be welded due to said elastic deformation, in a second stage the clamping means are moved backward to their inoperative condition, through a predetermined limited length, so as to create again a gap of substantially predetermined dimensions between the sheets to be welded, by exploiting the elastic return of said sheet which is elastically deformed in the first stage, the clamping means are kept in the condition reached thereby while welding is carried out, so that the vapours of the protective material which are generated during welding can escape through said gap $(G_1)$.

5. Welding systems according to claim 4, wherein said clamping means are provided with sensor means adapted to detect the condition of complete contact of the sheets, in that said actuating means are controlled by control means which receive the outage signals from said sensor means and cause the clamping means to stop in the condition of complete contact of the sheets, at the end of said first stage.

6. Welding system according to claim 5, wherein the clamping means comprise at least one movable member movable between an inoperative position and an operative position and that said control means cause the clamping member to stop at the end of said second stage, when they detect that a predetermined position has been reached.

7. Welding system according to claim 6, wherein said actuating means are selected among electric motors, fluid actuators, piezoelectric actuators, or shape memory alloy actuators.

8. Device for clamping with each other two or more overlapped metal sheets, which are to be welded, wherein it comprises:

- at least one clamping movable member, which is movable between an inoperative condition and an operative condition to press the overlapped sheets against each other,
- actuating means for actuating the clamping movable member,
- pressure sensor means able to detect the condition in which the clamping device keeps the sheets in complete contact with each other,
- control means which receive the signals from said sensor means and control said actuator means so that:
  - in a first stage, the clamping member is brought from its inoperative condition to its operative condition and stopped when a predetermined value of pressure is detected by said pressure sensor means with the metal sheets in complete contact with each other,
  - in a second stage, the clamping member is moved back towards its inoperative condition, by a limited length, until a predetermined position is reached to define a predetermined gap between the metal sheets.

9. Clamping device according to claim 8, wherein the clamping movable member comprises a main part which is pivotally connected to a support and an active part which is slidably mounted on the main part, said active part been movable with respect to the main part during said second stage, after that the two parts have rotated together with respect to the support during said first stage.

10. Clamping device according to claim 8, wherein the clamping movable member comprises a main part pivotally connected to a support and an active part which is rigidly connected to the main part, the entire structure of the movable member been moved back towards its inoperative position in said second stage.

11. Clamping device according to claim 9, wherein also said support is movable between an inoperative position and an operative position.

12. Clamping device according to claim 9, wherein the entire structure of the device is mounted with the possibility of a limited adjusting movement, for self-centering of the structure to be welded.

13. Sheets metal structure, comprising at least two metal sheets overlapped and welded to each other by means of the method according to claim 1.

14. Motor vehicle body, wherein it comprises a structure according to claim 13.

* * * * *